No. 880,990. PATENTED MAR. 3, 1908.
E. G. HARTLE.
AXLE.
APPLICATION FILED JULY 24, 1907.

2 SHEETS—SHEET 1.

Witnesses

Inventor
Edda G. Hartle,
By C. A. Snow & Co.
Attorneys

No. 880,990. PATENTED MAR. 3, 1908.
E. G. HARTLE.
AXLE.
APPLICATION FILED JULY 24, 1907.

2 SHEETS—SHEET 2.

Witnesses
E. W. Stewart
Jno E Parker

Inventor
Edda G. Hartle,
By C A Snow & Co.
Attorneys

UNITED STATES PATENT OFFICE.

EDDA G. HARTLE, OF COLUMBUS, OHIO.

AXLE.

No. 880,990.　　Specification of Letters Patent.　　Patented March 3, 1908.

Application filed July 24, 1907. Serial No. 385,384.

*To all whom it may concern:*

Be it known that I, EDDA G. HARTLE, a citizen of the United States, residing at Columbus, in the county of Franklin and State of Ohio, have invented a new and useful Axle, of which the following is a specification.

This invention has relation to axles and it consists in the novel construction and arrangement of its parts as hereinafter shown and described.

The object of the invention is to provide an axle with spindles adapted to swing in planes parallel with the axle and upon which ground wheels are journaled. Means is provided for swinging the spindles at the opposite ends of the axle simultaneously which means may be operated from a superstructure mounted upon the axle. Means is also provided whereby the axle may turn horizontally with relation to the superstructure without affecting the positions or operations of the spindles. This form of axle may be used to advantage upon agricultural implements adapted to operate upon hillsides and it may be used for artillery and other purposes.

Figure 1:
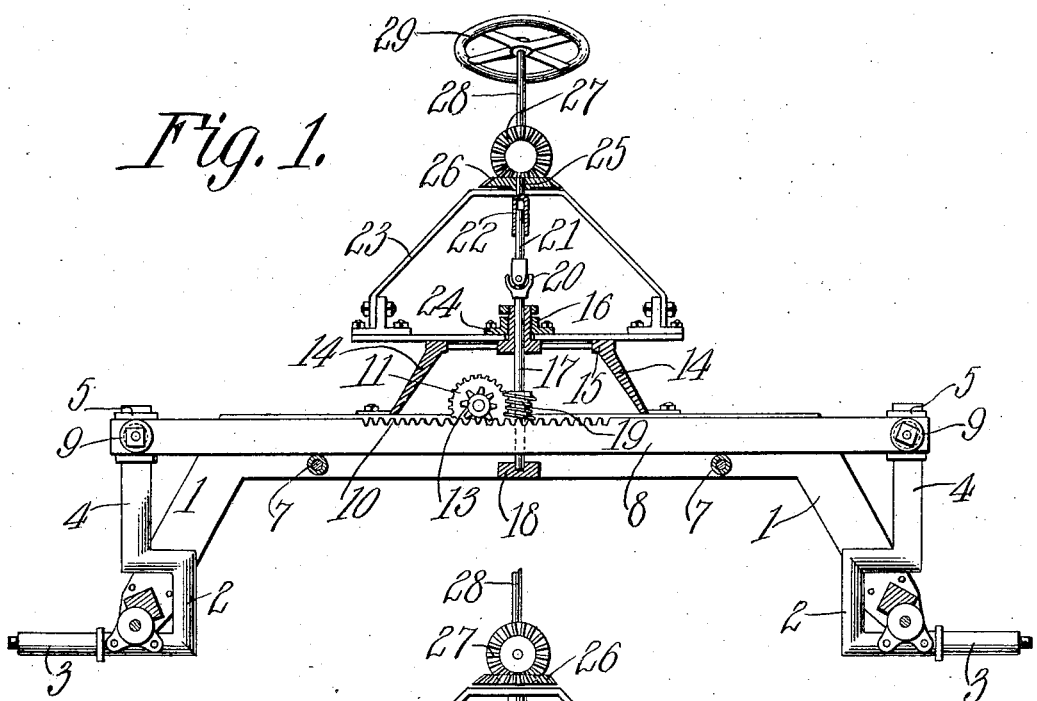
Figure 2:
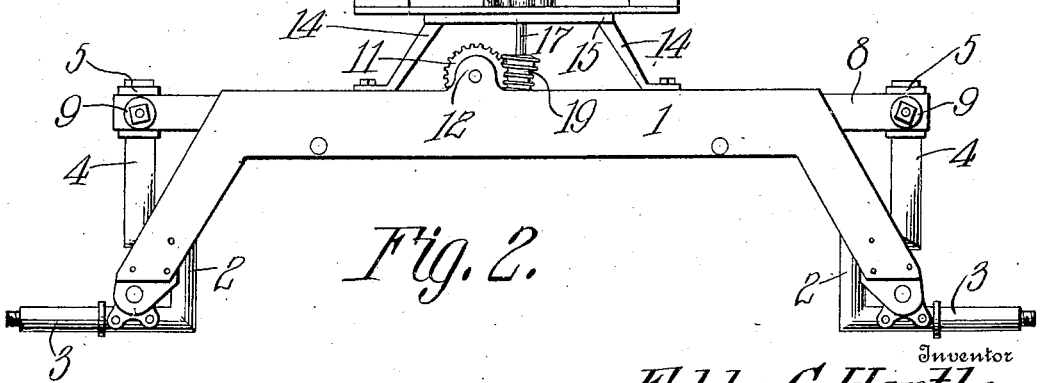
Figure 3:
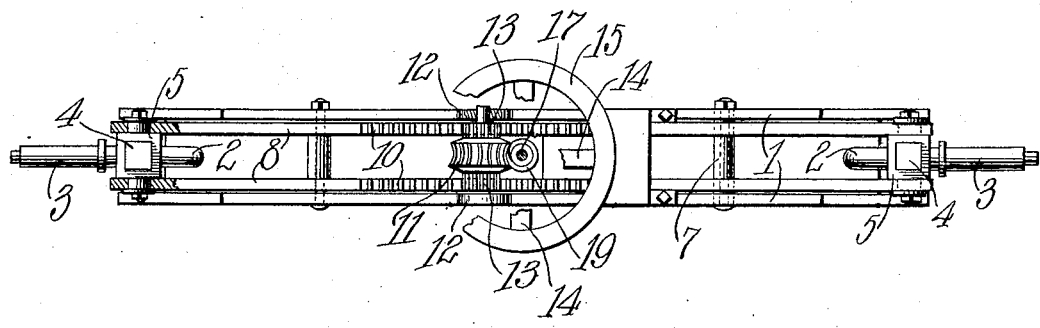
Figure 4:
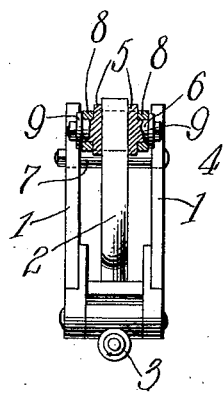

In the accompanying drawing:—Figure 1 is a longitudinal sectional view of the axle. Fig. 2 is a side elevation of the same. Fig. 3 is a top plan view of the axle with parts removed and parts broken away, and Fig. 4 is a sectional view of the axle cut on the line 4—4 of Fig. 3.

The axle consists of the binate cross beams 1 which are substantially U-shaped with horizontal intermediate portions. The beams 1, 1 are spaced apart and the spindles 2 are pivotally mounted between the ends of the opposite beam and are adapted to swing in planes parallel with the said beams. The spindles 2 have horizontal portions 3 upon which ground wheels may be journaled and the vertically disposed shanks 4 which are pitched at right angles to the portions 3. The upper ends of the shanks 4 slidably engage the collars 5. Said collars are provided at their sides with the trunnions 6. The rollers 7 are journaled between the intermediate portions of the beams 1 and the binate bars 8 bear at their lower edges upon the rollers 7. The bars 8 are located between the intermediate portions of the beams 1 and are spaced apart and are provided at their ends with bearings 9 which receive the trunnions 6 of the collars 5. The upper edges of the bars 8 are provided with teeth 10. The worm wheel 11 is journaled in bearings 12 mounted upon the intermediate portions of the beams 1. Said wheel 11 is provided at each side of its center with a pinion 13 and the said pinions mesh with the teeth 10. The frame 14 is mounted upon the intermediate portions of the beams 1 and is provided with a fifth wheel 15. The center of the frame 14 is provided with a vertically disposed tubular bearing 16. The shaft 17 passes through the bearing 16 and is journaled at its lower end in a bearing 18 supported by one of the beams 1. The worm 19 is located upon the shaft 17 and is in mesh with the worm wheel 11. The universal joint 20 is attached to the upper end of the shaft 17 and connects the stub shaft 21 with the said shaft 17. The stub shaft 21 is non-circular and fits in a corresponding recess provided in the socket 22. The said stub shaft 21 may slide longitudinally in the socket 22 but is restricted to rotation with the same.

The superstructure 23 is mounted upon and bears directly against the fifth wheel 15 and is provided with a central bearing plate 24 which is journaled upon the exterior of the tubular bearing 16. The frame work of the implement or vehicle which is supported by the axle is mounted upon the superstructure 23. The socket 22 is provided with a shank 25 which is journaled in the superstructure 23 and to which is attached the beveled gear wheel 26. The beveled pinion 27 meshes with the beveled gear wheel 26 and is mounted upon a shaft 28 which is adapted to be turned by an operator grasping the hand-wheel 29 also mounted upon the said shaft 28.

Inasmuch as the shaft 17 is disposed directly over the middle of the axle the axle may turn horizontally without moving the said shaft and without turning the superstructure 23. At the same time when the shaft 17 is turned through the connecting means above described rotary movement is transmitted to the worm wheel 11, which, through the pinions 13 will shift the bars 8 laterally with relation to the axle. Thus the spindles 2 are rocked upon their pivots and the wheels journaled thereon may be pitched into planes at any desired angle with relation to the surface of the ground. It is also obvious that after the wheels have been so pitched their positions will not be altered by the horizontal turning of the axle. By reason of the fact that the spindle shanks 4 slidably engage the sleeves 5 the said sleeves will move longitudinally along the said shanks as the bars 8 are shifted and thus compensate for the difference in direction assumed by the spindle shanks with relation to the said bars. At the same time, the said sleeves turn on their trunnions and remain in alinement with the shanks of the spindles.

Having described my invention what I claim as new and desire to secure by Letters-Patent is:—

1. An axle, spindles pivoted thereto, sleeves slidably mounted upon the spindles, binate bars receiving said sleeves between them and being pivoted thereto and means for shifting said bars.

2. An axle, spindles pivoted thereto, means for swing the spindles simultaneously, a fifth wheel mounted upon the axle and having a central tubular bearing, a longitudinally extensible shaft journaled in said bearing and forming a portion of the spindle swinging means and a superstructure mounted upon the fifth wheel and having a bearing plate journaled upon the exterior of the tubular bearing thereof.

In testimony that I claim the foregoing as my own, I have hereto affixed my signature in the presence of two witnesses.

EDDA G. HARTLE.

Witnesses:
ALBERT ROSS,
CHAS. M. COTT.